United States Patent
Rohleder et al.

(10) Patent No.: US 9,507,680 B2
(45) Date of Patent: Nov. 29, 2016

(54) VERIFICATION SYSTEM AND METHOD FOR AUTOMATED VERIFICATION OF REGISTER INFORMATION FOR AN ELECTRONIC SYSTEM

(71) Applicants: Michael Rohleder, Unterschleissheim (DE); Glen Nicholas Mithran Evans, Austin, TX (US); Bridget Catherine Hooser, Munich (DE); Carmen Klug-Mocanu, Aying (DE)

(72) Inventors: Michael Rohleder, Unterschleissheim (DE); Glen Nicholas Mithran Evans, Austin, TX (US); Bridget Catherine Hooser, Munich (DE); Carmen Klug-Mocanu, Aying (DE)

(73) Assignee: Freescale Semiconductor, Inc., Austin, TX (US)

( * ) Notice: Subject to any disclaimer, the term of this patent is extended or adjusted under 35 U.S.C. 154(b) by 37 days.

(21) Appl. No.: 14/222,918

(22) Filed: Mar. 24, 2014

(65) Prior Publication Data

US 2015/0269049 A1    Sep. 24, 2015

(51) Int. Cl.
  *G06F 9/455*    (2006.01)
  *G06F 17/50*    (2006.01)
  *G06F 11/26*    (2006.01)
(52) U.S. Cl.
  CPC .................. *G06F 11/261* (2013.01)
(58) Field of Classification Search
  USPC ......................................................... 716/28
  See application file for complete search history.

(56) References Cited

U.S. PATENT DOCUMENTS

| 2006/0248540 | A1* | 11/2006 | Stemer | G06F 8/73 719/321 |
| 2010/0107131 | A1* | 4/2010 | Bjesse | G06F 17/504 716/106 |
| 2014/0359545 | A1* | 12/2014 | Kundu | G06F 17/5045 716/107 |

OTHER PUBLICATIONS

Malthur, A. et al., "Design for Verification in System-level Models and RTL," 44th ACM/IEEE Design Automation Conference 2007, Jun. 4-8, 2007, San Diego, California, USA; ISBN: 978-1-59593-627-1, pp. 193-198.

* cited by examiner

*Primary Examiner* — Bryce Aisaka

(57) ABSTRACT

A system for verifying register information includes a design database containing a description of the electronic system, a register description database containing register information relating to the electronic system, a customization information module for storing a customization information extracted from the design database and a simulator which is arranged to execute verification stimuli in accordance with at least one check function and to generate a verification result. Verification stimuli are generated by combining register information with customization information. A mismatch between the expected and actual register implementation is recorded and the register in question identified. This permits corrections to be applied as appropriate to the document database or to the register description database. The corrected register description database may be used in a document generation process to produce an up-to-date reference manual for the electronic system.

16 Claims, 5 Drawing Sheets

VERIFICATION SYSTEM AND METHOD FOR AUTOMATED VERIFICATION OF REGISTER INFORMATION FOR AN ELECTRONIC SYSTEM

FIELD OF THE INVENTION

The present disclosure relates to an electronic system, and more particularly to electronic systems having register information.

BACKGROUND OF THE INVENTION

From the point of view of a developer who wishes to create software for a particular electronic system, it is highly desirable to have complete and fully verified documentation and collateral information of register information available to them as early as possible. Missing or incorrect information may lead to expensive trials, errors and development iterations which may further result in significant productivity loss. Trials are only possible with existing real hardware and software development cannot be completed until the hardware is defined. A known method for allowing early verification of software is the generation of reference models where a simulator enables the execution of software by more abstract version of the underlying hardware. This method is complex and difficult to automate. Another known electronic design methodology is the so-called Electronic System Level (ESL) design and verification. This approach focusses on top-down methods and does not take into account the usage of existing intellectual property (IP) blocks as building blocks.

Registers are an essential piece of any electronic system, for multiple reasons: they are the interface implementing the communication between the hardware blocks of such a system and the software being executed by this system. Besides that, registers control the functionality of the hardware blocks and provide or exchange the data used by the functionality implemented by these hardware blocks. In many cases, every register implemented within a hardware block may have a different register layout composed of multiple fields, for example, for allowing the recording of a single control bit or bit flag or multi-bit fields, thereby enabling the storage of data or multiple selections. The sheer amount of registers and fields implemented within registers is one of the issues for hardware verification and embedded software. Even simple electronic systems can have more than one hundred building blocks, each of those building blocks may employ registers, sometimes only a few but sometimes also significantly more than one thousand registers. Complex systems may have several hundreds of building blocks, and millions of registers and register fields. The task to document, verify and/or validate such registers or to create software for controlling the underlying hardware via those registers is one of the very complex tasks which need to be performed. One larger problem is the variability of those registers, caused by inclusion of different versions of an IP block, the large amount of parameterization possible within those IP blocks and the impact of hardware synthesis and connectivity on the register space. A result of the complexity and variability is that the identification and documentation of the actually implemented registers and register fields within an electronic system is of prime importance. This makes a complete, correct and consistent documentation of all registers and register fields within an electronic system an essential deliverable that needs to be provided as quickly as possible. The same is true for all collateral information related to registers and register fields; e.g. "header files" used by software compiler tools, control data used by software debugging tools, or other reference data needed by hardware debuggers or simulation environments. Any missing, incorrect, or invalid register or register field within such a document or collateral data might result in erroneous software implemented and thus causing a failure of the overall electronic system.

A reference manual for a typical electronic system may consist of several thousand pages and so creating such a document is time-consuming and complex. When creating such documents, it is preferable to ensure the usage of correct and complete information and that the document is kept up-to-date to reflect any changes made to the design database relating to the electronic system. Otherwise, documentation may contain only generic information which describes a superset of possibly-implemented registers and which is not tailored to the actual parameterisation of the various blocks that may comprise the electronic system. It may also quickly become outdated when changes to the hardware are not reflected in a timely fashion. The known IP-XACT standard defines an XML schema which describes electronic components and their designs to enable automated configuration and integration through tools. As registers are part of electronic components, the standard also enables the capture and exchange of related information and the use of this information by tools for further processing. However, IP-XACT and other interface standards do have their limitations as they generate the hardware blocks and the related verification data out of the same source. Another drawback is that parameterisation capabilities of IP-XACT and other related languages do not match the parameterisation capabilities of hardware description languages Therefore, there is a need for accurate and up-to-date documentation and collateral information, and particularly register information, which at least mitigates some of the disadvantages of the known systems.

SUMMARY OF THE INVENTION

The present invention provides a system and method for automated verification of register information for an electronic system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Register information may be used to produce related documentation and collateral information, for example, header files and debugging information used for software development and evaluation tools. Herein, the term "electronic system" may mean an electronic system or circuit which is implemented within an integrated circuit or a system-on-chip (SOC) or a system or circuit implemented by integrating multiple integrated circuits or SOCs on a printed circuit board.

Figure 1:
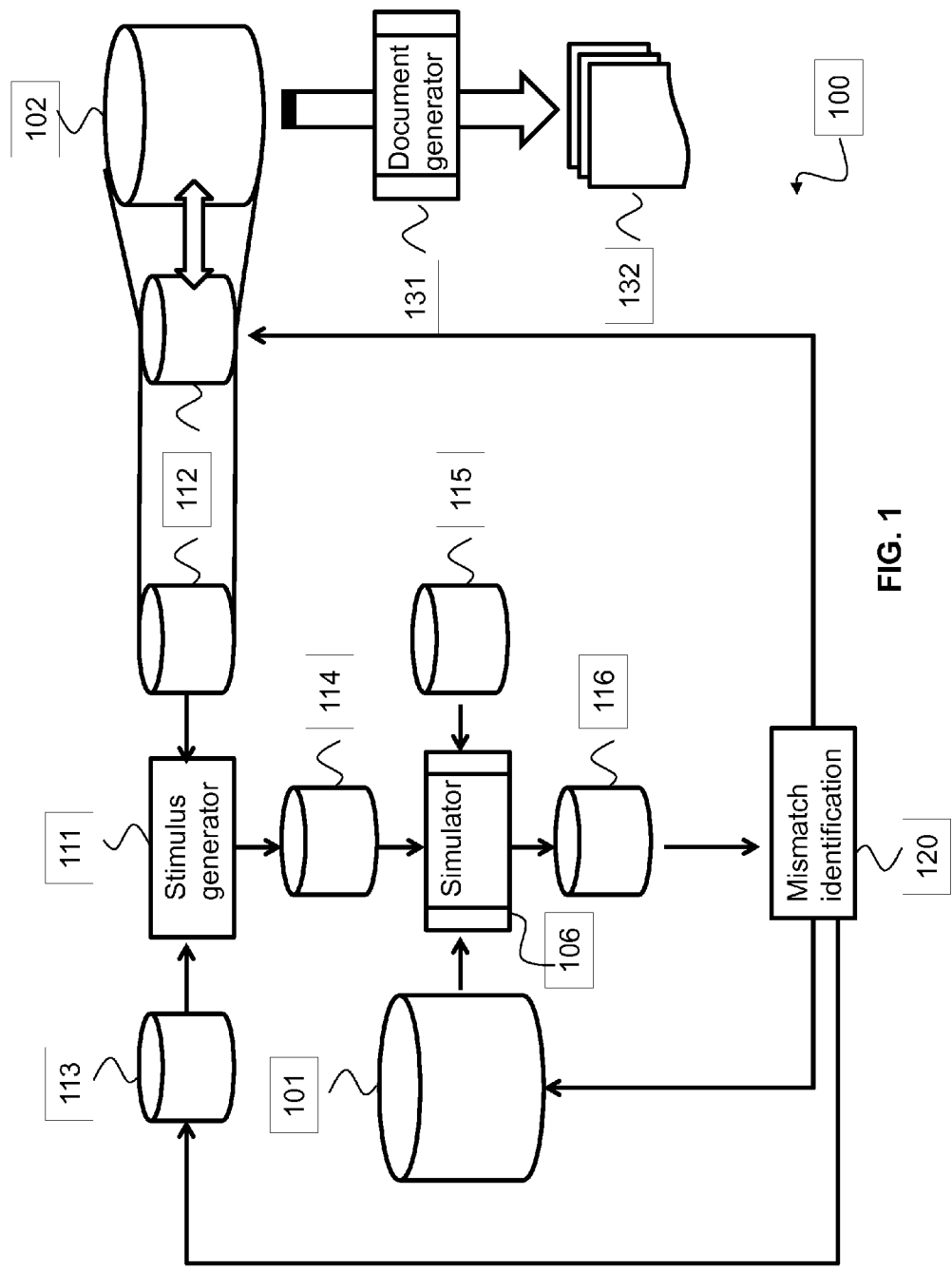
FIG. 1 is a simplified block diagram of an example of a system for automated verification of register information for an electronic system.

With reference to FIG. 1, a system for automated verification of register information for an electronic system is indicated at 100 and may include a design database 101 which describes a circuit design; for an electronic system, for example a system on chip (SOC). Such a design database is a well-known source when creating an electronic system and may comprise a netlist of various abstraction (RTL, gate level) descriptions of the connected components and many other data needed to derive the final product, the electronic system, from this database. Using this design database 101 enables checking the register behaviour concurrently with the development of the electronic system.

A register description database 112 may also be provided and may contain register information relating to the electronic system. The register description database 112 may be a "self contained" database or may be a database which is a subset of register information contained within a document information database 102 which relates to the electronic system. The document database 102 may contain information related to the electronic system; including register information. In many cases this information may be held in a central database holding documentation information for multiple electronic systems and related components; with the need for adaptations to a particular electronic system. Typically, the information stored in the document database may be in XML (extended mark-up language) format. The description of the electronic system stored in the document database 102 may not, however, conform exactly to the description in the design database. Hence, the system in accordance with an embodiment may be arranged to verify information contained in the document information database 102 against the design database 101. The register description database 112 may, typically contain information relating to the registers contained in the SOC. Such information may comprise, for example, register bit field information, reset values, access properties and memory map address related properties.

Register information may vary for several reasons. Firstly, the hardware building blocks used when creating an electronic system (such as an SOC) are continually updated to implement new or modified features and/or correct errors. These updates often follow their own lifecycle and are usually independent from other hardware building blocks and the system they are integrated in. As such, a newer version of an electronic system might either integrate the same or a different version of any hardware building block. Any update of a hardware building block may also involve changes to one or more registers in order to reflect the new or modified functionality or any other changes implemented by the new version of this IP block. As such, any new version of an electronic system may employ a different register set than a previous version of the same system. Secondly, the hardware building blocks themselves allow some variability to enable their reuse in different environments or for different purposes. This may be accomplished by providing multiple predefined features to modify certain aspects of those hardware building blocks. Examples for such features are "generate blocks", various forms of "parameters" (to provide modified values upon the instantiation of a hardware block), defines and ports with variable size. Any hardware block may use any combination of those features to adapt the actual implementation of this block to the particular needs upon instantiation in the system, resulting in significant differences. This "parameterization" may result in differently implemented blocks, even when the same block is instantiated multiple times within a system. Examples for common parameterisation schemes are blocks where buffer sizes (amount of entries) are controlled by a parameter, ADC's (analogue to digital converter) where the amount of conversion bits is controlled by parameters, busses where the size of the data transferred is defined by a parameter (8 bit, 16 bit, 32 bit, etc.), blocks implementing none, a single or an arbitrary amount of timers, communication modules implementing a certain amount of transmission modules, amount of channels within a direct-memory-access (DMA) module, etc. In all these cases, the specific amount of entries/bits/timers/modules, the existence of a specific feature or the size of a port/bus/entry may be controlled by parameterisation. Since all this functionality is related to registers or controlled by registers, the amount of those registers, their size or the size of implemented fields or also their existence or the existence of specific fields is and have to be controlled by other or the same parameters. As such, any form of parameterisation may have a significant impact on the registers actually being implemented within a particular instance of a hardware block within an electronic system. Thirdly, the known method of "synthesizing" hardware from a hardware description language provides another form of variability that may be impacted by the connectivity of a particular hardware block. When a synthesis tool detects functionality that can be removed and is not needed ("dead code") or is invariable or can be otherwise optimized, then it performs the corresponding changes automatically. Therefore, external connectivity may result in a modification of such a hardware building block within the final electronic system. Any such modification may result in the registers actually being implemented in a very similar manner to the predefined options for "parameterization".

With reference again to FIG. 1, a stimulus generation module 111 may receive information from the register description database 112 and create a set of stimuli that may be output to a stimulus database 114. The stimulus generation module 111 may also receive information from a customization information database 113 and may be arranged to modify or enhance created stimuli dependent on information from the customization information database 113 and may provide a resulting output to the stimulus database 114. The modifiers in the customization information database 113 and the corresponding changes of the behavioral description of at least a register within the register description database may be implemented such that it matches the actual behaviour modifications of the corresponding register(s) within the hardware. As such the combination of modifiers and modified behavioral description may be arranged such that it matches the capabilities of hardware description languages at a higher abstraction level. These modifiers may comprise features also used by the corresponding hardware description language or modifiers only made available within the behavioural description. The generation stimuli within the stimulus database 114 may comprises at least a call of a check function or at least a call of a check function for at least a register for a related IP block. A simulator module 106 may be provided and may receive inputs from the stimulus database 114, a check functions database 115 and the design database 101. A simulation results database 116 may receive an output from the simulator 106 and may have an output which may, in turn, may be fed to a mismatch identification module 120 to be described in greater detail below. The mismatch identification module 120 may have outputs which may be coupled to the design database 101, the customization information database 113 and the register description database 112. A document generation module 131 may be provided and may be coupled to the document information database 102 and arranged to generate a reference manual 132 or other documentation or collateral information.

The system 100 of FIG. 1 can be thought of comprising a 'correction and confirmation loop' whose results may be used in a document generation process or for generating collateral information. The 'system 100 may verify the register description database 112 in combination with data provided by customization information 113 in order to correctly reflect the actual hardware implementation of the electronic system (SOC) with respect to the behavioural implementation of its registers. For this purpose the actual hardware implementation of the electronic system may be represented by the design database 101, which may be described by a set of IP blocks integrated into an electronic system and described by a hardware description language. In usual known development methodologies, the final electronic system is usually directly derived from the design database 101. Using this design database 101 enables the verification of the corresponding register information concurrently with the development of the electronic system.

The verification of the register behaviour is accomplished by executing a set of stimuli, which may be generated by the stimulus generation module 111 and stored in the stimulus database 114. The generation of the corresponding stimuli by the stimulus generation module 111 may use the register behaviour specified within the register description database 112 and combine it with data extracted from the customization information database 113, thereby generating a set of stimuli that verifies the correct, complete and consistent implementation of these registers by the design database 101 by calling at least a check function from a check function library.

The simulator module 106 may be arranged to verify the correct behaviour, completeness and consistency of the registers specified by the previous operation with the registers implemented within the design database 101 by executing the stimulus from the stimulus database 114 in accordance with some check functions 115 provided for this purpose. This simulation operation may record its findings in the simulation results database 116. These recorded results may be recorded for all verification stimuli provided by the stimulus database 114.

A mismatch identification module 120 may be arranged to identify mismatches between the expected and the actual register implementation and behaviour. This module may be arranged to extract corresponding information from the simulation results, and to identify IP blocks, registers, and register fields that are exhibiting mismatches in the implementation of at least one feature. Upon identifying at least one mismatch, the mismatch identification module 120 may be arranged to select data required to identify the root cause for the mismatch and to provide supporting information for performing the required updates; which may result in modifications of the design database 101, the register description database 112, or the customization information database 113.

The above described 'correction and confirmation loop' may be performed multiple times, until there are no more or only an acceptable amount of mismatches; thus providing a register database that is proven against the actual hardware implementation. Since this loop may be executed at any time during the hardware development process, in particular when the development is not yet finished, it also permits the creation of early 'proven' documentation based on a design database having a mixed maturity level. A further benefit of this 'correction and confirmation loop' is the usage of related collateral information about hardware registers (e.g. software header files) that may be proven implicitly by the verification operations within this loop permitting also a verification of this information.

A subsequent operation may be the generation of corresponding documentation 132 (e.g. a Reference Manual, or a User Manual, etc.) or collateral information by the document generation module 131 from the document information database 102. The information related to registers within this database may be either compared against a proven register description database 112 or directly taken from it.

Figure 2:
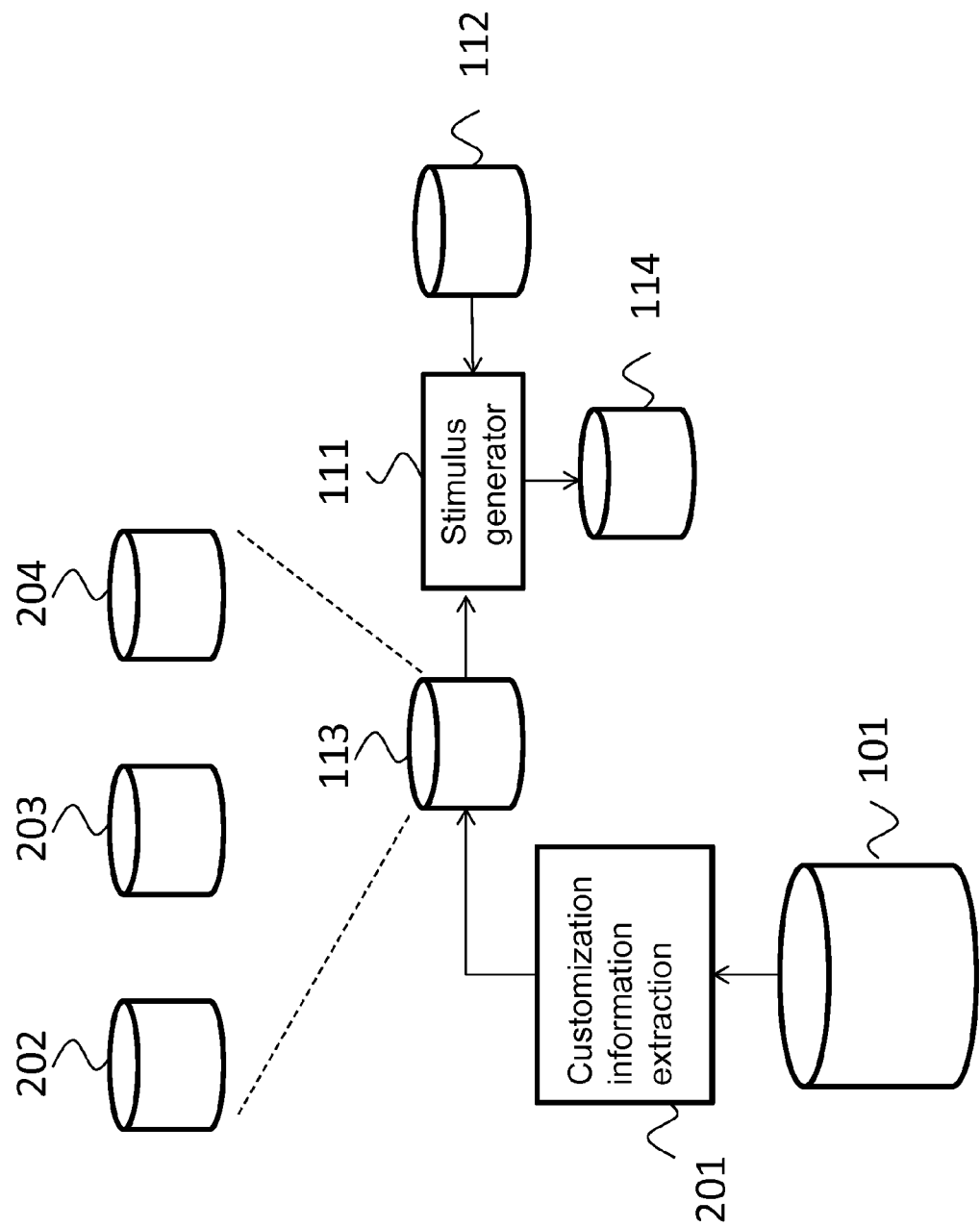
FIG. 2 is a simplified block diagram of an example of a system for creating a verification stimulus.

FIG. 2 schematically illustrates the generation of a stimulus. The stimulus generation module 111 may create a set of verification stimuli which may be stored in the stimulus database 114 for use by the simulator module 106. For this purpose, the stimulus generation module 111 may use the information stored in the register description database 112 and combine it with data stored in the customization information database 113. The customization information 113 may comprise several sets of information, some of which may be extracted by a customization information extraction module 201 from the design database 101. Examples of customization information are as follows: configuration management information 202 arranged to identify a list of IP blocks which comprise the SOC, their version and the instantiation information for every instance of an IP block; parameterization information 203 which may be arranged to reflect the set of parameters and other parameterization means (e.g. defines) used by the design database 101 to parameterize the IP block instances, connectivity and customization hints 204 which are used to identify modifications caused by connectivity and other customization information and their impact on the register behaviour. The stimulus generation module 111 may then generate a set of stimuli for the verification of all features intended to be verified. For this purpose it may generate a set of verification stimuli arranged to verify a feature by calling at least a check function from the check function database 115 or by calling at least a check function for every involved register. For this purpose at least a stimulus may be generated for every IP block and the generation of a corresponding stimulus may be suppressed when there is no register within this IP block that exhibits the feature to be verified, To ensure the completeness and consistency of the generated checks, the stimulus generation module 111 may generate not a single, but a set of stimuli, where the corresponding checks are instrumented to perform a positive check as well as a matching negative check.

Referring also to FIG. 1, the simulator module 106 may, in an example, be arranged to verify that every specified register does actually exist (positive check) and that there is no other register existing in an area that is marked as reserved (negative check). The latter check can be very extensive because it requires verification of many combinations of possible access sizes and access modes.

In another example, the verification process may comprise verifying that every specified register field is properly implemented (positive check) and that there is no bit and bit field existing in register bits marked as reserved (negative check).

In another example, the verification process may comprise verifying that register fields specified as writable can be modified (positive check) and that register fields specified as readable cannot be modified (negative check).

In another example, the verification process may comprise verifying that the reset value specified for a register is correct, thereby ignoring bits that are specified as indeterminate.

In another example, the verification process may comprise verifying that register fields can take the possible or specified values (positive and negative check).

In another example, the verification process may comprise verifying that access properties, such as allowed access sizes, access in supervisor mode, or permitted/restricted accesses in specific modes (e.g. test mode) are implemented properly and that the register behaviour is reflecting this.

In a further example, the verification process may comprise verifying that protection attributes and setup conditions are properly implemented.

The corresponding checks may be implemented in form of check functions which may be held in the check function database 115, and which may be called by the stimuli generated by the stimulus generator module 111. The actual implementation of these check functions may be provided in form of a function library. The stimulus generation module 111 may only provide the function call and its function parameters and include required data within the generated stimuli.

One example embodiment of such function calls may be "STD_STIM_RESERVED_RANGE(block_name, protect2, slotbase, slotsize, addrmask, area_2_startaddr, area_2_endaddr)". This is a check function which may be used to verify a particular feature related to a reserved range. The function parameter <block_name> may be used to parse the block name. Tme. The enumeration parameter <protect2> identifies the feature to be checked. The remaining parameters <slotbase>, <slotsize>, <addrmask>, <area_2_startaddr>, and <area_2_endaddr> specify function parameters that have been calculated by the stimulus generator module 111. These parameters specify block/register specific information that has been derived from the register description database 112 taking the customization information held in the customization information module 113 into account.

Another example is "STD_STIM_REG_PROT_ CHECK_REG ("PQSPI_C", "CR4", &PQSPI_C_CR4, 16, 0x1FF, 0xFE00, 0x0, 0x0, 2)". This is a check function which may be used to verify register protection attributes for the register "CR4" of the block instance "PQSPI_C", which is a 16-bit register located at the address &PQSPI_C_CR4 (this symbolic reference is taken from a header file, which is implicitly verified this way). The remaining parameters for this function are bit masks derived from values that the stimulus generator module 111 has derived from the register description database 112 taking the customization information held in the customization information module 113 into account.

A further example is "STD_STIM_CHECK_READ_ONLY_BITS (RC_CTL_ROMASK, "RC", "RC_CTL", &RC_CTL, 32, 0x00000010, 0x3F1F00, 0xFFC0E0FF, 0x0, 0x0)". This is a check function which may be used to verify the bits specified as read-only within the register CTL of the IP block instance named RC, which is a 32 bit register located at the address &RC_CTL (a symbolic value taken from the header file that is implicitly verified this way). The value 0x00000010 selects the register bits assumed to implement such behaviour, while the symbolic name RC_CTL_ ROMASK specifies the related entry in the header file (which is again implicitly verified this way). The remaining parameters for this function are bit masks derived from values that the stimulus generator module 111 has derived from the register description database 112 taking the customization info 113 into account.

A further example is "STD_STIM_CHECK_READ_ WRITE_BITS (LINFLEX0_UARTCR_RWMASK, "LINFLEX0", "UARTCR", &LINFLEX0_UARTCR, 32, 0x007FFFFF, 0x7FFFFF, 0xFF800000, 0x0, 0x0)". This is a check function which may be used to verify the bits specified as readable and writable within the register UARTCR of the IP block named LINFLEX0, which is a 32 bit register located at the address &LINFLEX0_UARTCR (a symbolic value taken from the header file that is implicitly verified this way). The value 0x007FFFFF selects the register bits assumed to implement such behaviour, while the symbolic name LINFLEX0_UARTCR_RWMASK ROMASK specifies the related entry in the header file (which is again implicitly verified this way). The remaining parameters for this function are bit masks derived from values that the stimulus generator module 111 has derived from the register description database 112 taking the customization information held in the customization information database 113 into account.

Another example is "STD_STIM_CHECK_ACCESS_ SIZES(48, "PFLASHC", "PFLASHC_PFCR0", &PFLASHC_PFCR0, 32, 0x11, 0xFFFFFFEE, 0x0, 0x0)". This is a check function which may be used to verify the permitted access sizes for the register PFCR0 of the IP block instance named PFLASHC, which is a 32 bit register located at the address &PFLASHC_PFCR0 (a symbolic value taken from the header file that is implicitly verified this way). The value 48 is an encoded value that specifies the permitted access sizes. The remaining parameters for this function are special masks derived from values that the stimulus generator module 111 has derived from the register description database 112 taking the customization info 113 into account.

As the above examples illustrate, there are several function parameters being calculated by the stimulus generator module 111 that are additionally being passed to the check functions. These parameters pass values to the check functions that are either required to control the check function or to provide information about side effects, bit patterns or specific behaviour of register bits that needs to be taken into account by the check functions. The corresponding values may in all cases be calculated by the stimulus generator module 111 by using information from the register description database 112. Additionally, customization information (e.g. parameterization data, hints, etc.) related to the corresponding block, register, or register field that is being extracted from the customization information database 113 may be taken into account for the calculation of these parameters. In some particular cases, such customization information may even result in the stimulus generator module 111 issuing a call to a specific setup or post-processing function, also being part of the check function database 115, before or after such a check function. An example for such a behaviour may be a register that is implemented with outside connectivity which requires some special setup to avoid undefined data being retrieved, or a register that may only be accessed with a specific "unlocking" sequence that must be executed before accessing the register itself.

Figure 3:
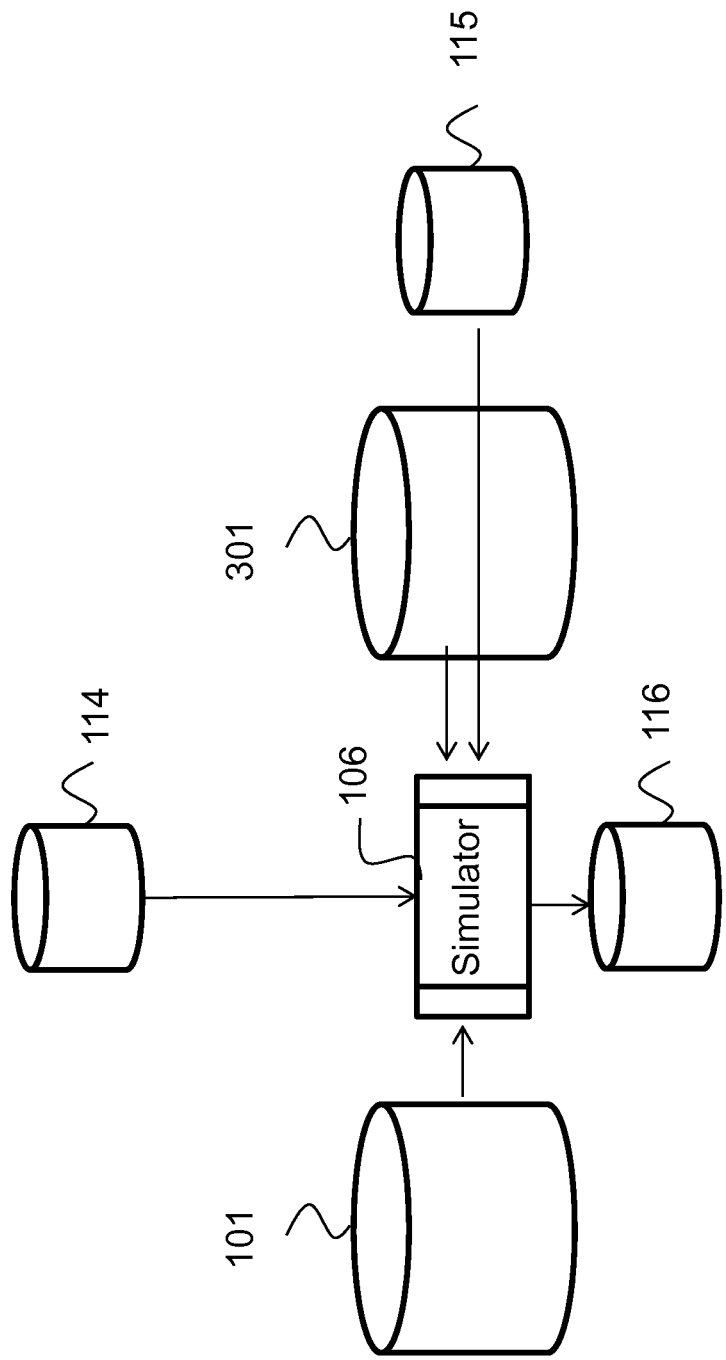
FIG. 3 is a simplified block diagram illustrating an example of operation of a simulator.

Reference will now be made to FIG. 3. In one example embodiment, the generated stimuli stored in the stimulus database 114 may be executed by the simulator module 106. The simulator module 106 may be a simulator, of known design which is capable of simulating the behaviour of the design database 101 described in a hardware description language; e.g. Verilog (IEEE 1364), SystemVerilog (IEEE 1800) or VHDL (IEEE 1076) or a more abstract hardware description language like it is possible with SystemC (IEEE 1666) or other more rare languages (e.g. Handel-C, Bluespec) that are also used for this purpose.

In some examples, the execution of a stimulus utilises a "testbench 301, which may be provided to ensure the correct setup of the electronic system (SOC) for the simulation which is described by the design database 101. Such a testbench 301 may also provide appropriate signals and signal sequences to its external interfaces, support recording of data and messages and enable the execution of stimuli as well as many other related activities.

The actual stimulus from the stimulus database 114 that is executed by the simulator module 106 in order to verify a particular feature of at least one register implemented within a particular block instance, may perform a check function provided out of a set of check functions (held in the check function database 115) for each block instance or for each related register within the block instance. This check function may comprise a sequence of at least one register access to the particular register referred to (the "register under test"). For every register access performed by a check function, this check function provides or calculates an expected result, determines the actual result and identifies an eventual mismatch between both values. Furthermore, a check function may perform an eventually required initialization of a register, identify permissible values for writing into a register, and specify the data of interest for the comparison between the expected and the actual value. It may also be capable of identifying, expecting or suppressing exceptional behaviour of the hardware which may occur in relation to or caused by the register accesses performed during the execution of the check function. During the execution of the check functions, at least one information entry may be created to reflect the result of the register accesses. These information entries may be recorded along with other information within a simulation results database 116.

Figure 4:
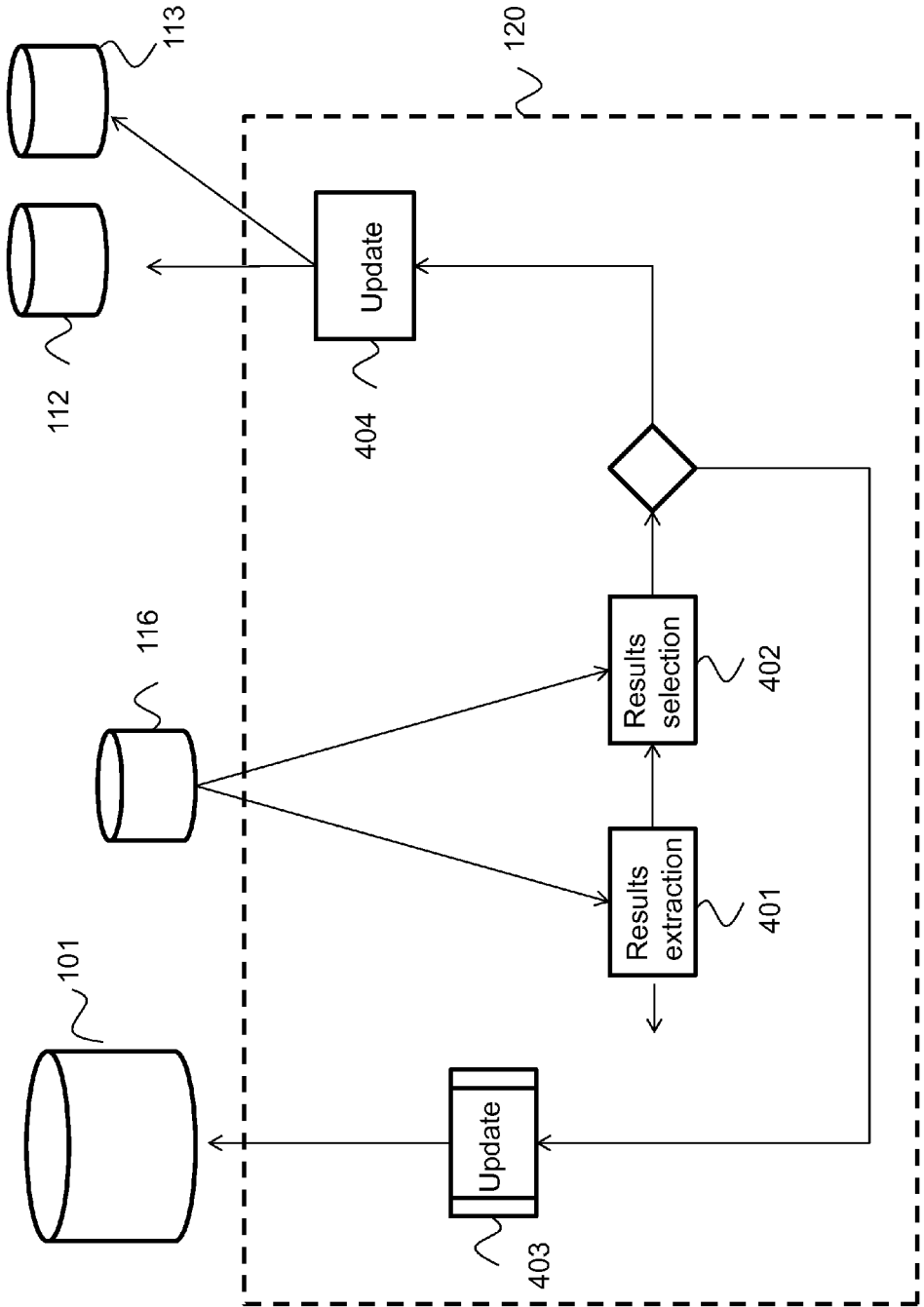
FIG. 4 is a simplified block diagram showing an example of a part of the system of FIG. 1.

With reference now to FIG. 4, the mismatch identification module 120 of FIG. 1 is shown here as a collection of functional modules in order to illustrate an identification and update process. The update process may be based on the simulation results held in the simulation results database 116. For the purpose of a subsequent automatic processing, check functions may create specially formed, unique information entries within the simulation results. These information entries may be generated while the check functions evaluate the results of the register accesses; e.g. by comparing them against expected results or behaviour as described previously. Those unique information entries may comprise at least one string for identification purposes, combined with further information about the feature being verified, its status, the related IP block instance, register, register field and the associated functionality and provide further information that may be of interest for further processing.

In an example embodiment, a corresponding information string may look like "[ERROR_INFO: FEATURE=<feature> BLOCK=<block> REG=<reg> FIELD=<field>EXPECTED=<expected> ACTUAL=<actual>]" in case of a mismatch found with respect to the feature <feature> of the register <reg> implemented within the block instance <block>. Herein the format "[ERROR_INFO: . . . ]" identifies the unique information entry, and the string set "FEATURE=<feature>", "BLOCK=<block>", "REG=<reg>", "FIELD=<field>", "EXPECTED=<expected>", "ACTUAL=<actual>" may specify associated information. Another example of a corresponding information string may look like "[CONFIRMATION: FEATURE=<feature> BLOCK=<block> REG=<reg>]" to confirm the correctness of the feature <feature> for the register <reg> implemented within the block instance <block>. For each of these fields, the first string "FEATURE", "BLOCK", etc. may specify the information, while the string "<feature>", "<block>", etc. may specify the actual data; here we are using only placeholder strings < . . . > for descriptive reasons. The set of fields within an information entry may be feature specific and vary. In some cases the corresponding information may be located in a different database than the simulation results, and only be referred by the data specified within the fields.

In one example, a results data extraction module 401 may use these unique information entries to extract relevant information and associated data from within the simulation results held in the simulation results database 116 for further processing. For this purpose, the result data extraction module 401 may use the common implementation scheme of regular expression parsing, as described in the above. By checking for confirmation entries, it may be possible to not only identify mismatches, but also to ensure that all specified checks have been executed in the appropriate order. Only when there are no mismatches reported, and all confirmation entries are extracted in the appropriate order, no further processing is required. Otherwise, further processing is required to identify and resolve the issues found while executing a check function. Often the actual mismatch may already be identified by the information entries reported by the actual check function. However, in many cases, the incorrect behaviour of one or multiple registers implemented within a block instance may cause a several mismatches identified by multiple check functions; therefore the correct and unambiguous identification of the incorrect feature and associated block instance, register and eventually register field may not be possible based on the results of a single check function.

To identify the exact set of failing features in case of multiple mismatches, a result selection module 402 may use the extracted information from multiple check function runs. For this purpose, the result selection module 402 may evaluate the information generated from multiple check functions as it is extracted by the result data extraction module 401; by combining this information and applying ordering rules the exact set of features exhibiting a mismatch in the behaviour of the registers and/or their fields can be identified.

The result selection module 402 may be arranged to identify the set of blocks, registers, and features exhibiting a mismatch between the expected and the actual behaviour within the electronic system. As such it may reduce the effort to be spent for identifying such mismatches. However such mismatches may have multiple causes. For example, the hardware description in the design database 101 may be incorrectly implemented. This case is actually an error within the design database 101 and may be corrected manually at this point. The exact identification of the feature exhibiting the mismatch by the mismatch identification module 120 may provide some supporting information for selecting the root cause of the problem in the hardware description As another example, the configuration management information of the design database 101 may not be correctly reflected in the customization information database 113, selecting an incorrect version of the IP block or an incorrect, incomplete or modified parameterization. In this case, the mismatch identification module 120 may identify differences or changes in the version information or the parameters of the involved IP block to support the identification of the root cause. Such kind of incidents may be resolved by updating the customization information 113 accordingly or by correcting the corresponding version or parameterization information for the involved IP block within the design database 101. In a further example, the behavioural description of an IP block or at least one of its registers or register fields may be incorrectly or incompletely reflected within the register description database 112. In this case, the register description database 112 may be enhanced or extended to correctly reflect the behaviour. In a further example, the behavioural description of an IP block within the register description database 112 may incorrectly or incompletely reflect the impact of customization information on the register behaviour. In this case, the register description database 112 may be enhanced to correctly reflect the behaviour. N another example, the hardware description of an IP block or an register or register field within such an IP block in the design database 101 may have been modified without getting noticed; In this case the behavioural description of the register in the register description database 112 may be updated accordingly. In another example, the parameterization information for a particular block within the design database 101 may have been implemented incorrectly or inconsistently. In this case, the parameterization information in the design database 101 may be corrected. In a further example, the parameterization information for a particular block within the design database 101 may have been modified without being reflected in the customization information 113 or does not match this information. In this case, the customization information 113 may be updated accordingly. In a further example, connectivity information within the design database 101 may not be correctly reflected in the customization information 113. In this case, the customization information 113 must be updated accordingly.

In some cases the result selection module 402 may be arranged to be capable of identifying the actual root cause for a mismatch. However, in some cases it may be preferable to identify the root cause for the mismatch with manual intervention. Either of these two options may be decided within the mismatch identification module 120. In the first case (relating to the actual root cause), this is an error or an incorrect modification of an IP block, the related connectivity or associated parameterization information. In this case, the design database 101 needs to be corrected. This may be done through a design database update process 403 which is a usual process for any modifications of the design database. In the second case (relating to the root cause), this can occur when the design database 101 and the corresponding configuration management information and parameterization information is correct. In this case it is likely that an unnoticed modification within the design database, its connectivity, or the related configuration management or parameterization information exists. In this case the corresponding customization information in the customization information database 113 may be modified accordingly. On the other hand, there may exist an incorrect description of the register behaviour in the behavioural description of the register in the register description database 112; which may then be corrected. In any of the above cases, a set of update commands or actions may be created and executed in a register description database and customization information update database 404.

Figure 5:
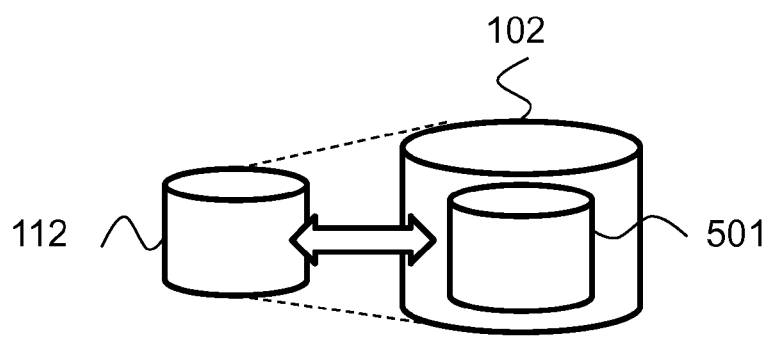
FIG. 5 is a simplified block diagram illustrating an example of a relationship of register information and a document database.
Figure 6:
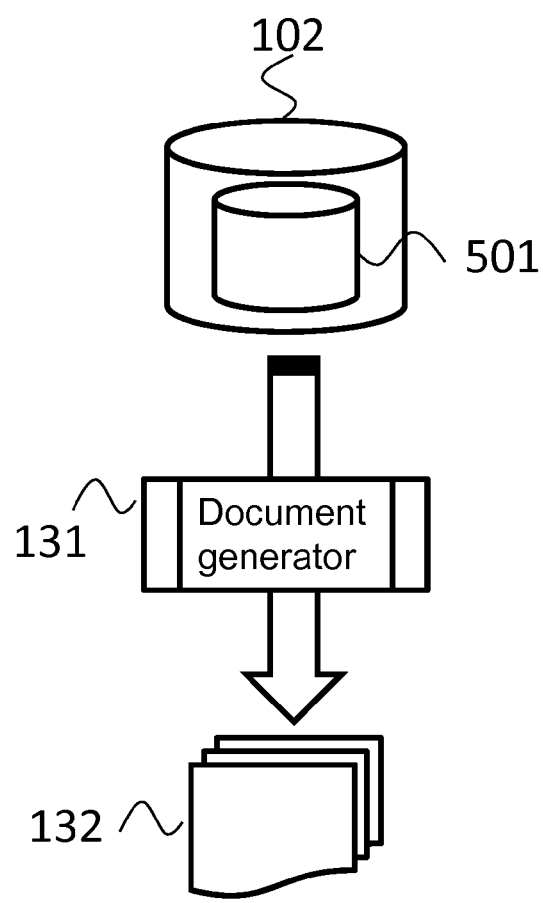
FIG. 6 is a simplified block diagram illustrating an example of the use of the system of FIG. 1 for document generation and collateral information.

With reference to FIGS. 5 and 6, there may be multiple usages of the register information that has been verified as described above. One of the possible usages of this verified register information is the generation of reference documentation for an electronic system or SOC, for example. An example is the so called "User Manual" or "Reference Manual". For these kinds of documents, the correct descriptions of the registers and their fields are a key component. Registers are the interface between the hardware of the electronic SOC and the software running on it. Therefore, correctly and completely describing all actually implemented registers the register fields is of prime importance for any software written for the SOC.

For this reason, any document information database 102 used for the generation of such a document 132 should preferably at least contain register information 501 for document generation. This register information 501 may be enriched with a textual description of the functionality controlled by the registers and the fields within these registers. A conventional document generation module 131 may be arranged to generate the document 132 from the document information database 102 and then combine the register information 501 with these textual descriptions, properly format the results, and finally generate a human readable document 132. The document generation module 131 may be arranged to further create collateral information about registers; e.g. a header file. In this case the content of this file should match the implemented hardware as well as its documentation. Generating such collateral data from the same source as the documentation may therefore be preferable. For a generator module 131 being used for generating collateral information, the only difference is in the format of the output file; header files are intended for usage by compilers and require therefore a different formatting. It is expected that the documentation exactly matches the registers made available by the electronic system (or SOC for example) created from the design database 102. Such a document should preferably describe all registers of the SOC. Omitting just a single register is highly undesirable. On the other hand, describing registers that are not available in the SOC, can lead to false assumptions when generating software and should preferably be avoided.

The existence of a register information database 112 that has been proven to match the registers actually being implemented on the corresponding electronic system is then a benefit. FIG. 5 reflects two possible usages of this register information database 112. For example, it may be directly used as a source for the register descriptions in the document information database 102. In this case, the register information databases 112 and 501 are equivalent. Alternatively, the two register information databases 112 and 501 may be compared to obtain matching information. For this purpose, a machine-readable, structured data format such as the extensible markup language (XML) for the register descriptions may be used. Using such a format enables an easier mapping of the registers, fields and related information and thus an automated, tool supported comparison.

Thus the invention has the advantage of being able to provide verified register information for inclusion in a reference manual at an early point in time during the design process of an electronic system; for example.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Further, the entire functionality of at least some of the modules shown in FIG. 1 may be implemented in an integrated circuit Such an integrated circuit may be a package containing one or more dies. Alternatively, the examples may be implemented as any number of separate integrated circuits or separate devices interconnected with each other in a suitable manner. For example, an integrated circuit device may comprise one or more dies in a single package with electronic components provided on the dies that form the modules and which are connectable to other components outside the package through suitable connections such as pins of the package and bondwires between the pins and the dies.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems".

However, other modifications, variations and alternatives are also possible. The specifications and drawings are, accordingly, to be regarded in an illustrative rather than in a restrictive sense.

In the foregoing specification, the invention has been described with reference to specific examples of embodiments of the invention. It will, however, be evident that various modifications and changes may be made therein without departing from the broader spirit and scope of the invention as set forth in the appended claims.

In the claims, any reference signs placed between parentheses shall not be construed as limiting the claim. The word 'comprising' does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A verification system for automated verification of register information for an electronic system, the verification system comprising:
   a design database containing a description of the electronic system,
   a register description database containing a behavioural description of registers,
   a customization information database for storing customization information specific to a particular version of the electronic system,
   a stimulus generator arranged to generate verification stimuli by combining information stored in the register description database with customization information, a check function database, a simulator operably coupled to the design database and arranged to execute said verification stimuli in accordance with at least one check function from the check function database and arranged to generate a simulation result, a mismatch identification module arranged to evaluate the simulation result and to identify a mismatch between an expected behaviour of a register access and an actual behaviour of said register access and arranged to enable identification and correction of a root cause of a mismatch within the design database, the customization information database or the register description database, a document information database containing the behavioral description of registers, wherein the document information database contains register information, the register information comprising the behavioral description of the registers, wherein the register information is enriched with a textual description of functionality controlled by the registers and fields within the registers, and a document generator for generating documentation based on the behavioural description of the registers, the documentation selected from a group consisting of a user manual and a reference manual, wherein the document generator is configured to generate the documentation based on the behavioral description of the registers contained in the document information database, to combine the register information with the textual description, to format results, and to generate from the results a human readable document.

2. The verification system of claim 1, wherein a behavioural description of registers is arranged to reflect the register behaviour with respect to memory mapped accesses to the registers of each IP block included in the electronic system described by the design database.

3. The verification system of claim 2, wherein a behavioural description of registers is arranged to reflect modifications of register behaviour controlled by modifiers provided by the customization information database.

4. The verification system of claim 1, wherein a behavioural description of registers is arranged to reflect modifications of register behaviour controlled by modifiers provided by the customization information database.

5. The verification system of claim 1, wherein customization information includes at least one of the following: configuration management information, parameterization information, and connectivity information.

6. The verification system of claim 1, wherein customization information is arranged to reflect modifiers implemented within a specific electronic system, said modifiers comprising, for any building block comprising the electronic system, at least one of the following:

building block instantiation specific modifiers that are different between multiple instances of the same building block;

building block specific modifiers that are common for all instances of the building block;

building block specific modifiers that select behaviour that is specific to a particular version of a building block; and building block specific modifiers that remove register or field related features of a building block.

7. The verification system of claim 1, wherein each check function comprises a sequence of at least one access to a register under test and is arranged to verify one of the features or a particular aspect of a feature in the context of the register under test.

8. The verification system of claim 1, wherein the mismatch identification module is arranged to identify a mismatch of at least one feature or a particular aspect of a feature, wherein a simulation in the context of the design database exhibits behaviour of a corresponding register that is different from the expected behaviour as described in the register description database taking into account the specific customization as specified in the customization information database.

9. The verification system of claim 1, wherein the mismatch identification module is arranged to locate a specific form of information record within the simulation result, wherein a record specifies a result of the execution of a check function, wherein data, detailing an identified mismatch, are provided with such information records in cases where an unsuccessful execution has been flagged.

10. The verification system of claim 1, wherein the mismatch identification module is arranged to identify a failure feature of a block or register by combining the data from the information records of multiple check function executions within a simulation result by evaluating data provided by information records in a certain predefined order, in order to select the failing feature.

11. The verification system of claim 1 wherein the document generator is configured to further generate a header file for usage by a compiler for compiling executable instructions.

12. The verification system of claim 1 wherein the document generator is configured to be in a correction and confirmation loop including the correction of the root cause of the mismatch by the mismatch generator.

13. The verification system of claim 1 wherein the behavioural description of the registers has been proven to match the registers actually being implemented in the electronic system, resulting in the documentation being proved to match the registers actually being implemented in the electronic system.

14. The verification system of claim 1 wherein two register description databases using a machine-readable, structured data format are compared to obtain matching information proven to match the registers.

15. The verification system of claim 14 wherein the machine-readable, structured data format is an extensible markup language (XML).

16. The verification system of claim 1 wherein verification of corresponding register information upon which generation of documentation is based is configured to occur concurrently with development of the electronic system.

* * * * *